April 10, 1951   C. W. DEO   2,548,256
BATTERY CARRIER
Filed Dec. 17, 1947   2 Sheets-Sheet 2
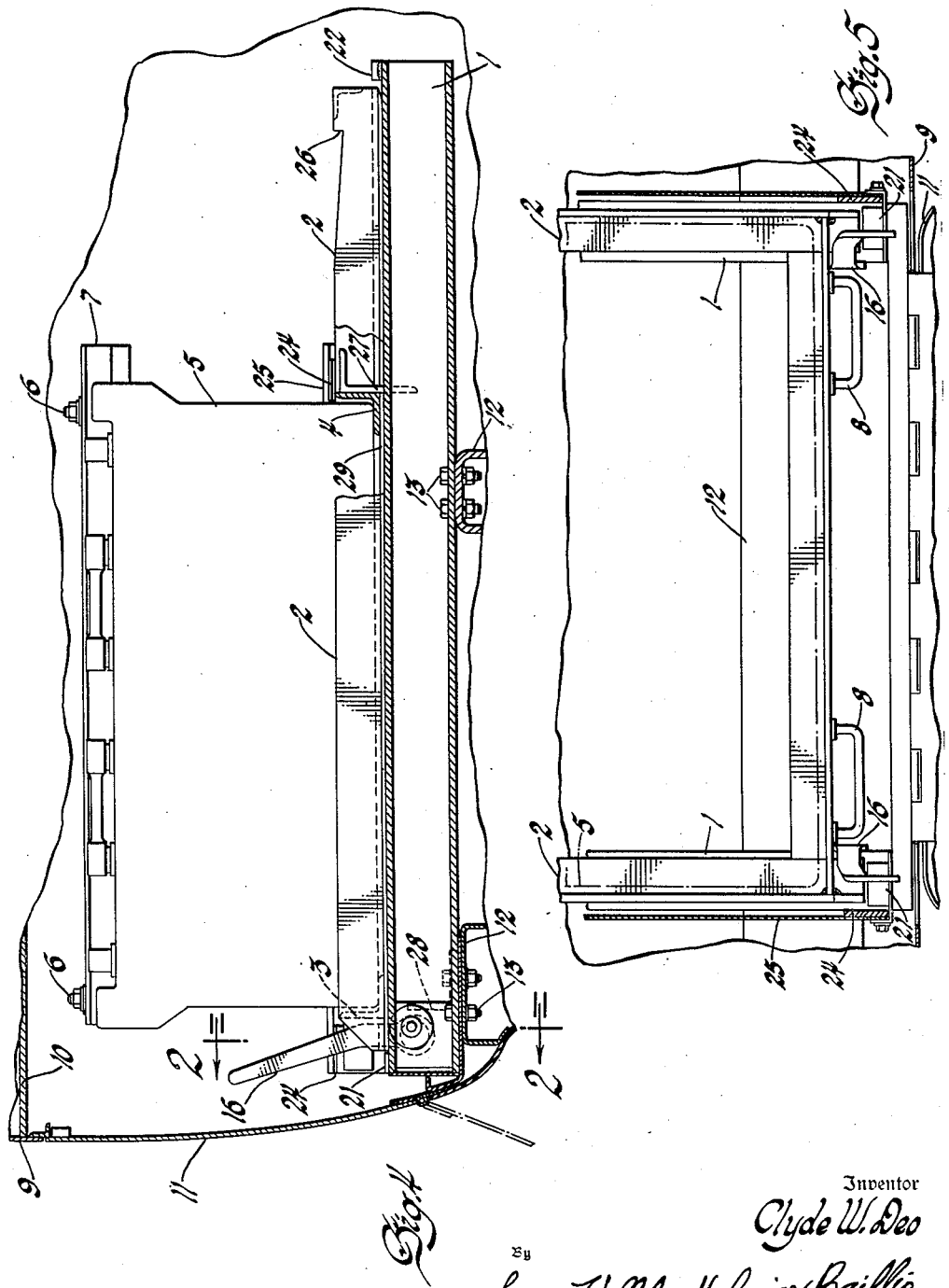
Inventor
Clyde W. Deo
By
Spencer, Willits, Helmig & Baillio
Attorneys

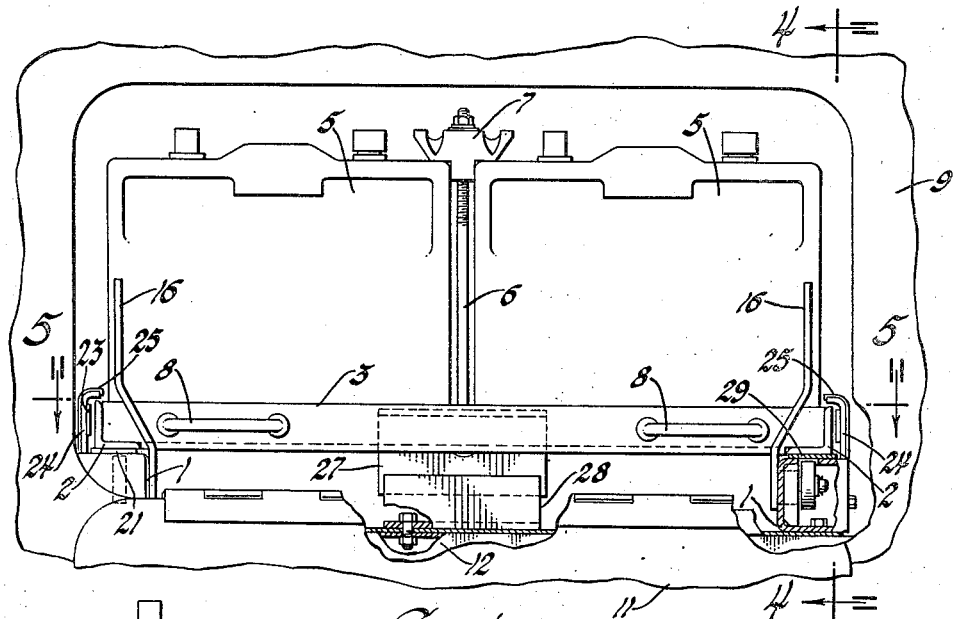
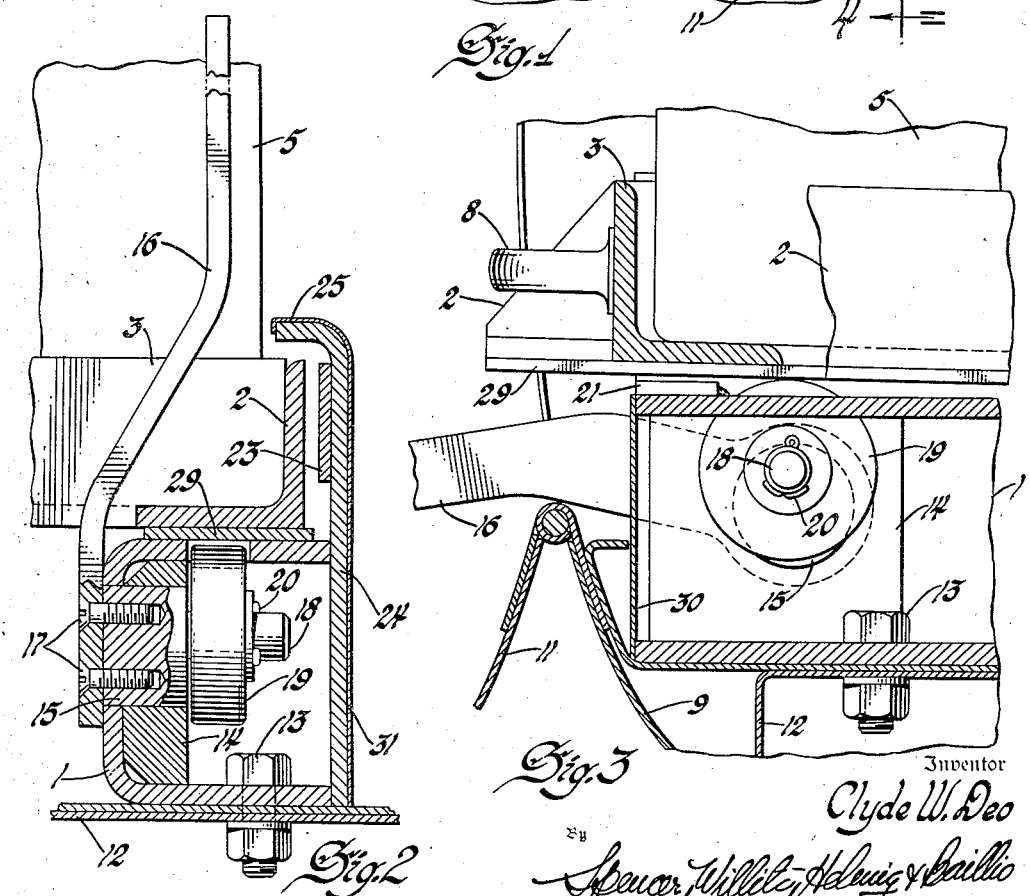
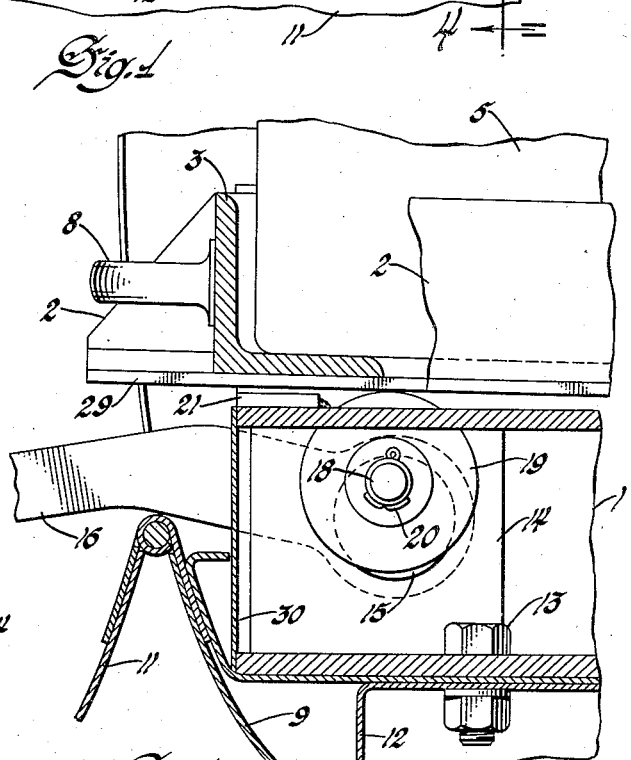

UNITED STATES PATENT OFFICE 2,548,256

BATTERY CARRIER

Clyde W. Deo, Waterford, Mich., assignor to General Motors Corporation, Detroit, Mich., a corporation of Delaware Application December 17, 1947, Serial No. 792,316

4 Claims. (Cl. 180—68.5)

This invention deals with the mounting and handling of electric storage batteries as part of the operating equipment of vehicles, such as passenger buses or motor road coaches. To facilitate mounting and replacement of batteries and their periodic examination from outside the vehicle it is proposed to mount the battery by suitable hold-down on a tray or skid which can be slid through a body side wall on a trackway fixed below the passenger floor. This will enable storage in a restricted space and yet provide an abundance of working room outside the vehicle for service inspection upon withdrawal of the skid tray from its storage pocket or well. It also eliminates the need for inspection doors inside the body which might be awkward to reach, weaken the floor and be unsightly in appearance.

Because of the heavy storage battery weight a sturdy carrier tray is called for, especially when the vehicle is equipped with two batteries making a combined slidable load in the neighborhood of 400 pounds. This weight can be taken advantage of, especially by using ungreased slide rails because the frictional surface engagement between the tray and its supporting track runners and their tendency to freeze or stick together affords a brake to resist or guard against accidental displacement of the battery carrier under road shock and inertia. To free the frictional contact surfaces and eliminate excessive manual effort for tray manipulation it is proposed to employ rollers adjustably mounted near the storage compartment entrance and which by means of hand levers can be lowered out of tray engagement or raised to an overcenter locked position to elevate and support the tray for its wheeled travel.

In the accompanying drawing illustrating a preferred embodiment of the invention Figure 1 is an elevation of the front of the tray in storage position; Figure 2 is an enlarged sectional view as on line 2—2 of Figure 4; Figure 3 is a fragmentary sectional view showing the roller elevated, with the tray a little forward from storage position and Figures 4 and 5 are side and top views, respectively, on lines 4—4 and 5—5 of Figure 1.

As will be readily apparent from the drawings the assembly consists largely of low cost conveniently available parts of non-precision character and they are arranged for mutual stiffness and cooperation in carrying the load. Thus the fixed tracks consist essentially of a pair of spaced channel irons 1—1 for supporting the skid tray comprising four angle irons welded together to afford a pair of side rails 2—2, a front connecting bar 3 and a rear connecting bar 4 thereby forming a rectangular frame of a size to receive a pair of conventional storage batteries 5—5. The batteries rest on the horizontal flanges of the angle irons and are located against lateral displacement by the upwardly extending vertical flanges and are tied in place by a pair of hold-down studs 6—6 extending between the batteries from the connecting bars 3 and 4 and a strip 7 seating on the adjacent upper corners of the batteries.

Pull knobs or handles 8 are fastened on the front of the forward bar 3 of the slide tray for convenient manual manipulation of the tray through the access opening in the body side wall 9. The access opening to the storage space under the passenger floor 10 normally is closed by a door 11 hinged as shown along its lower edge to swing downwardly out of the way. Within the underfloor space and closed by the skirting of the body side wall 9 the channel shaped tracks 1—1 are secured to the body underframing 12 by bolts 13 passing through the lower flanges of the channel tracks.

Welded or otherwise joined to the web of each track channel 1 near its forward edge is a bearing block 14 having an aperture aligned with a similar aperture in the channel web to journal therein a cylindrical bearing 15. An operating handle 16 is secured by screws 17 to one end of the bearing 15 and a crank or offset pin 18, preferably integrally formed with the bearing, projects from the opposite end and rotatably carries a roller 19 held thereon by a cotter pin 20. Swinging of the operating handle 16 outwardly and downwardly cranks the roller 19 from its lower position below the top of the track, as shown in Figure 2, to a raised position through a slot in the track to lift and support the tray slightly above the track surface, as seen in Figure 3. By properly arranging the parts the axis of the offset pin 18 can be moved slightly beyond dead center with respect to the axis of the cylinder 15. By reason of this overcenter relation and the engagement of the operating handle 16 with a suitable stop, such as the hinge for the closure door 11, the roller will be maintained in its raised position. The tray can then be rolled easily back and forth with only its rearmost end portion sliding on the track.

Lifting of the tray also enables its forward edge to clear a stop in the form of an abutment plate 21, welded on the top of the track 1 and which cooperates with a similar abutment 22 at the opposite or rear end of the track in blocking fore and aft displacement of the tray from its storage position. To guard against lateral displacement and assist in guiding tray travel the vertical flanges of the tray side rails 2—2 cooperate with rub rails 23 supported by a series of straps 24 welded to and projected upwardly from the channel tracks 1 at spaced intervals along the lengths of the tracks. Each strap 24 has its upper portion flanged inwardly as at 25 to overlie the upper edge of the track side rail and serve as a retainer when the track is projected from its pocket and tends to overbalance and tilt its rearward edge upwardly.

In this connection it will be noted from Figure 4 that the upper edge of the track side rail has an angular cutout toward its innermost end and which forms a limit stop shoulder 26 for engagement with the inturned flange 25 of an adjacent strap 24. This ratchet stop acts only when and if the tray is tilted so as to raise the upper edge of the rail 1 into sliding abutment with the flange 24. The stop shoulder may, however, be passed under the flange by rocking the tray. This ratchet stop for a first increment of travel is of importance primarily in the event that instead of two batteries only a single battery is mounted on the tray and is positioned transversely so that the load is all toward the forward end of the tray. A more positive stop against complete removal is provided through interference from a pair of angle brackets 27 and 28 fastened, respectively, to the back bar 4 of the tray and the body underframing 12.

Wear strips or facings may be interposed between the tracks and the tray side rails and fastened to either or both thereof. A single facing is shown at 29 as a lining for the tray side rails. For appearance purposes a sheet metal cover plate 30 may be positioned over the outer end of each channel track. In addition sheet metal sheathing 31 can be extended alongside the track and the upright strips for stiffening the parts and imparting to them a finished appearance.

I claim:

1. In a vehicle body having a storage pocket in a wall thereof, a skid runner mounted in said pocket, a shiftable tray bottoming on said runner, a limit stop fixed to said runner and projected above the same at its forward end to abut the front end of the tray and thereby resist skidding of the tray in its retracted storage position, a tray engageable roller adjacent said limit stop and a crank arm mounting for said roller operable to raise the roller and thereby tilt the tray so that the adjacent tray portion is elevated above said abutment stop while the rear of the tray is skiddably supported on the runner.

2. In combination, a supporting trackway, a skid carriage bottoming throughout its length on the trackway in normal storage position, interengaging stop abutments on the carriage and trackway to resist relative skidding movement from storage position and means to lift the front end of the carriage out of contact with the trackway while leaving its rear end in slidable engagement with the trackway, said means including a roller adjacent the forward end of the trackway and normally positioned out of carriage supporting relation but directly under the front end of the carriage when the carriage is in storage position and means to shift the roller into carriage supporting relation in which the carriage is tilted in relation to the trackway and said stop abutments are out of engagement with one another.

3. In a battery mounting of the character described, a skid carriage, a fixed track therefor, raised limit stops at the front and rear of the track and spaced apart a distance corresponding to the length of the carriage to define therebetween a depressed pocket on which the carriage bottoms and is retained by said limit stops in storage position, a member mounted adjacent and inwardly of the forward limit stop and vertically adjustable between positions respectively above the forward limit stop and below the track level, said member when in lowered position being directly under the forward end of the carriage when the carriage rests within said pocket and means to raise or lower said member into or out of supporting engagement with the carriage either to elevate the carriage out of said pocket or to lower the carriage into the pocket.

4. In a battery mounting of the character described, a skid carriage, a fixed track therefor, raised limit stops at the front and rear of the track and spaced apart a distance corresponding to the length of the carriage to define therebetween a depressed pocket on which the carriage bottoms and is retained by said limit stops in storage position and a vertically adjustable member adjacent the forward limit stop operating to tilt the carriage out of said pocket so that the carriage front end clears the forward limit stop while its rear end continues to rest on the track, and including a crank journalled for rotary movement about a fixed axis positioned directly below the forward end of the carriage when the carriage is bottomed in said pocket, said crank being provided with an eccentrically positioned axle and a carriage engaging roller pivotally mounted on said axle.

CLYDE W. DEO.

REFERENCES CITED

The following references are of record in the file of this patent:

UNITED STATES PATENTS

| Number | Name | Date |
|---|---|---|
| 521,647 | Edwards | June 19, 1894 |
| 1,209,962 | Heath | Dec. 26, 1916 |
| 1,678,033 | Brumbaugh | July 24, 1928 |
| 2,173,298 | Gravenstine | Sept. 19, 1939 |

FOREIGN PATENTS

| Number | Country | Date |
|---|---|---|
| 573,426 | Great Britain | Nov. 20, 1945 |